United States Patent [19]

Tanaka

[11] Patent Number: 5,179,553
[45] Date of Patent: Jan. 12, 1993

[54] STRIP FRAME RECOGNITION APPARATUS

[75] Inventor: Koichi Tanaka, Kawasaki, Japan

[73] Assignee: Kabushiki Kaisha Toshiba, Kawasaki, Japan

[21] Appl. No.: 579,339

[22] Filed: Sep. 6, 1990

Related U.S. Application Data

[63] Continuation of Ser. No. 366,543, Jun. 15, 1989, abandoned.

[30] Foreign Application Priority Data

Jun. 16, 1988 [JP] Japan ............................... 63-149153

[51] Int. Cl.$^5$ .............................................. H04J 3/14
[52] U.S. Cl. ................................. 370/85.5; 370/85.14
[58] Field of Search .............. 370/85.13, 85.14, 85.12, 370/85.1, 85.15, 85.5, 85.4; 340/825.05

[56] References Cited

U.S. PATENT DOCUMENTS

| | | | |
|---|---|---|---|
| 4,494,233 | 1/1985 | Bahr et al. | 370/86 |
| 4,558,428 | 12/1985 | Matsumura et al. | 370/86 |
| 4,567,590 | 1/1986 | Bederman | 370/86 |
| 4,680,756 | 7/1987 | Sugimoto et al. | 370/88 |
| 4,811,009 | 3/1989 | Orimo et al. | 370/85.12 |

FOREIGN PATENT DOCUMENTS 0146831 12/1983 European Pat. Off. .

OTHER PUBLICATIONS

Token Ring Access Method and Physical Layer Spec. ANSI/IEEE Std. 802.5-1985 p. 33.

IBM, "Token-Ring Network Architecture Reference", Part 1, Chap. 2, Feb. 1986, pp. 12 and 20-21.

Intel Corp., "Microsystem Components Handbook Peripherals Volume II", Chap. 7, 82586 Local Area Network Corpocessor, Nov. 1983.

S. Bederman et al., "Retransmission Using Stored CRC Values", *IBM Technical Disclosure Bulletin*, vol. 26, No. 8, Jan. 1984, pp. 332-334.

The Small Computer Revolution, Proceedings of COMPCON '84, Dec. 30, 1984, pp. 334-339.

*Primary Examiner*—Douglas W. Olms
*Assistant Examiner*—Min Jung
*Attorney, Agent, or Firm*—Foley & Lardner

[57] ABSTRACT

A strip frame recognition apparatus which is installed in a station of a token ring local area network for recognizing a received frame as a strip frame which has been transmitted from the station in order to prevent the frame from going around a ring more than one round, comprising a transmission frame strip address extraction circuit (101) for extracting a strip address from a predetermined field of a transmission frame, a retention circuit (12) for retaining the strip address extracted by the extraction circuit (101), a received frame strip address extraction circuit (111) for extracting information corresponding to the strip address from a received frame, and a coincidence detection circuit (13) for comparing the information extracted by the extraction circuit (111) with the strip address retained in the retention circuit (12), detecting coincidence beween the information and the strip address, and judging by detection of the coincidence that the received frame is the strip frame.

6 Claims, 3 Drawing Sheets

STRIP FRAME RECOGNITION APPARATUS

This application is a continuation of application Ser. No. 07/366,543, filed Jun. 15, 1989, now abandoned.

BACKGROUND OF THE INVENTION

This invention relates to a strip frame recognition apparatus which is installed in a communications station of a token ring local area network (LAN), and that recognizes communication data (hereinafter called "a frame") once transmitted to a ring from, and received by, the station as a frame to be stripped in order to prevent the frame from going around the ring more than one round.

In a token ring LAN, as illustrated in FIG. 1, all communications stations $1_1$, $1_2$ and $1_3$ are connected with one another in the form of ring and transfer a transmission right known as a "token" in the order of connection to the ring so that only one station among them can transmit at any time. A station which has transmitted a frame, when the station received the same frame, shall strip the transmitted frame in order to prevent the frame from going around ring 2 more than one round. In this case, judgement whether to strip a frame or not shall be based on the value of source address field (SA) included in the frame. Therefore, a conventional station sets the address of the station in its frame receiving circuit prior to starting operation and, when the SA of the received frame becomes equal to the set address, the station judges that the received frame is the frame to be stripped (hereinafter called "the strip frame"). In addition, the above-mentioned set address is used for judging whether the received frame is addressed to the station or not by coincidence of the set address with the value of destination address (DA) field of the received frame. Therefore, the set address is called a receive address.

Furthermore, typical structure of a frame is illustrated in FIG. 2. Namely, a frame consists of fields for each data, such as a start delimiter (SD) indicating the start of the frame, access control (AC) indicating the priority order of the frame, frame control (FC) indicating the classification of the frame, destination address (DA) indicating a destination station, source address (SA) indicating a source station, routing information (RI) indicating the route from the source station to the destination station, frame check sequence (FCS) to detect errors occurring in net communications information and communication end delimiter (ED) indicating the end of the frame, and frame status (FS) indicating receiving condition at the destination station. In addition, 48 bits or 16 bits is specified to be used for the SA field (16 bit address is used only in the configuration of smaller network; the case of 48 bits is mainly explained herein) and 32 bits for the FCS field.

In the LAN of token ring system, plural rings are connected with one another to form a more complicated network. Stations to connect these rings mutually are specifically called bridge stations.

In the network illustrated in FIG. 3, for example, two rings, $2_1$ and $2_2$, which have three stations respectively, are connected through bridge stations, $1_{B1}$ and $1_{B2}$. In this network, station $1_1$ belonging to ring $2_1$, addresses station $1_3$ belonging to ring $2_2$ (hereinafter reference numbers are used as addresses) using a frame set up with the information of DA=$1_3$, SA=$1_1$, RI=$2_1$ to $2_2$. Bridge station $1_{B1}$ belonging to ring $2_1$, when receiving this frame, detects a requirement to transfer the frame to ring $2_2$ according to RI information, so $1_{B1}$ transfers the frame to bridge station $1_{B2}$ belonging to ring $2_2$. Bridge station $1_{B2}$ sends this frame to ring $2_2$ after obtaining the token of ring $2_2$.

In this case, since the content of the frame which bridge station $1_{B2}$ sents remains DA=$1_3$, SA=$1_1$, RI=$2_1$ to $2_2$, bridge station $1_{B2}$ should set in its frame receiving circuit the address "$1_1$" of source station $1_1$, but not that of bridge station $1_{B2}$ in order to strip this frame.

As above, in the token ring LAN of FIG. 1, each station sets the receive address to its own individual address in its frame receiving circuit and recognizes the frame to be stripped and addressed to the station on the basis of the set value. However, in the LAN in which plural rings are connected with one another, when the bridge station transmits a frame received from another ring, the bridge should set in the frame receiving circuit the address of another station that is not the address of the bridge station. Consequently, the following problems will happen.

In the case as above, the bridge station resets its address in the frame receiving circuit when stripping of the frame received from another ring is completed. However, if an error happens in the network and the frame to be stripped is lost because of the error, the resetting time causes a long delay since the frame is not stripped. Therefore, even if the a new frame addressed to the bridge station is sent to the network before resetting the receive address, the bridge station cannot recognize the new frame as addressed to the station.

Furthermore, if an error condition happens, each individual address should be set in the receiving circuit of each station to recover the error. However, errors cannot be recovered from immediately because resetting of the station address at the bridge causes delays.

In order to solve these problems, there is an idea of an system in which a memory circuit of exclusive use for an address (hereinafter called strip address) is used for recognizing the strip frame and provided in a frame receiving part of the bridge station. Before transmission of a frame the SA of the frame is set in the memory circuit as the strip address by a control processor of the bridge station according to software. However, this system has the following problems to solve.

1) The bridge station should set a new strip address in the memory circuit every time before transmission of the frame, but time delay for transmission of the frame occurs because of time needed for software to execute a procedure of setting the strip address.

2) Program coding for the bridge, station becomes complicated and the quantity of the programming increases.

3) Since operation of a non-bridge station and that of a bridge station are different, it is difficult to realize both operations with the same hardware by use of an LSI having a built-in program.

In addition, such a system has a weak point that it needs a large scale circuit to inspect coincidence between the SA value of a memory circuit and SA of a received frame because the SA is as long as 48 bits.

SUMMARY OF THE INVENTION

The object of this invention is to make hardware common to both the non-bridge and bridge stations, and to make the program for strip address setting unnecessary in order to simplify the program and to reduce the quantity of programming.

Another object of this invention is to downscale the strip address inspection circuit.

This invention offers a strip frame recognition apparatus which is installed in a communications station of a LAN of token ring system and recognizes a frame transmitted from the station and received again by the station as a strip frame comprising: strip address extraction means for extracting a strip address from a transmission frame, a retention means for retaining the strip address extracted by the strip address extraction means, information extraction means for extracting information corresponding to the strip address from a received frame, and coincidence detection means for comparing the information extracted by the information extraction means with the strip address retained in the above-mentioned retention means and for detecting coincidence between both of them.

According to the strip frame recognition apparatus related to this invention, the strip address is extracted from the transmission frame and retained in the station. When a frame is received by the station, the information corresponding to the strip address is extracted from the received frame and is compared with the strip address retained, and judgement on whether the received frame is the strip frame or not is made on the basis of the result of the comparison. Since the strip address can be created by hardware from the transmission frame, the program for setting the strip address is unnecessary. Further, since the strip address for every transmission frame is created at every transmission, the apparatus of this invention is applicable to both bridge and non-bridge stations. Therefore, the same hardware can be adapted to both the bridge and non-bridge stations.

The source address (SA) of a transmission frame can be used as the strip address. In this case, at the time of transmission, the SA is extracted from the transmission frame and retained, and when the transmission frame is received, it is recognized to be stripped by comparing the retained SA with the SA extracted from the received frame.

The frame check sequence (FCS) of a transmission frame also can be used for the strip address. In this case, as mentioned above, the FCS is 32 bits, smaller by 16 bits than 48 bits of the SA, the retention means and the coincidence detection means can be downscaled by above difference in bit numbers.

When the FCS is used as the strip address, in order to minimize the influence of errors as far as possible, it is desirable to use not the final value of the FCS but an intermediate value of the FCS calculation up to the SA field of the transmission frame. This is because the intermediate value is enough to identify the source station, and because the probability that an error may occur in the range up to the SA field is substantially smaller than by using the whole range of FCS.

In the case where the FCS code is used for the strip address, only a part of bits of the FCS and not all bits of the FCS, can be used. In such a way the retention means and the coincidence detection means can be downscaled more. In that case, the probability that the same FCS occurs for different source stations can be minimized enough to cause no practical problem by selecting a moderately large number (e.g. 16 bits) as a bit number used as the strip address.

DETAILED DESCRIPTION OF THE PREFERRED EMBODIMENT

Figure 4:
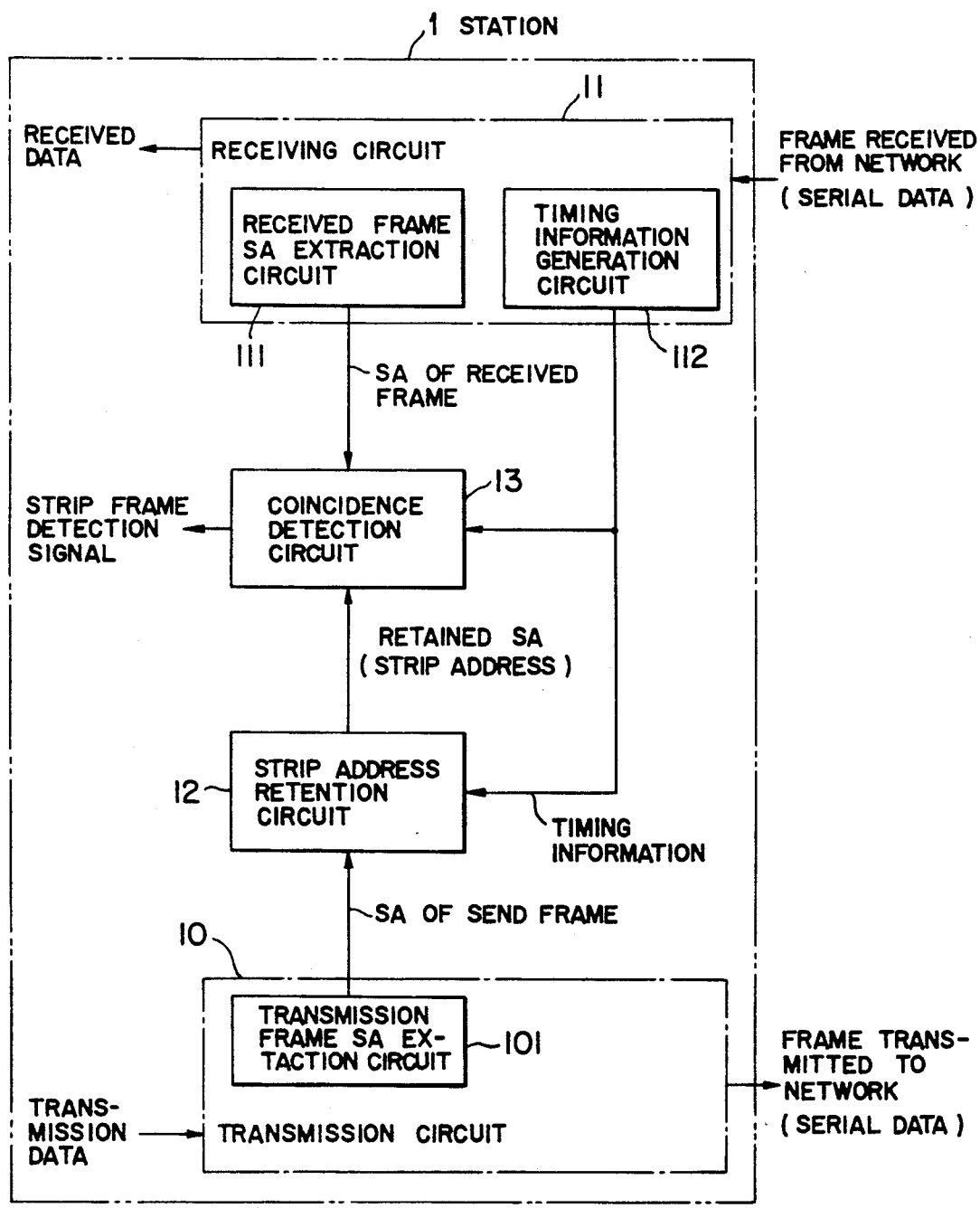
FIG. 4 is a block diagram showing the configuration of a preferable embodiment of the strip frame recognition apparatus of this invention.

The strip frame recognition circuit of an embodiment of this invention illustrated in FIG. 4 is installed in a communications station 1 of LAN and can operate whether communications station 1 is a bridge station or a non-bridge station.

Station 1 is equipped with an internal circuit (not illustrated), a transmission circuit 10 which receives transmission data from the internal circuit and transmits it to the network, and a receiving circuit 11 which receives data from the network and sends it to the internal circuit. The internal circuit is the circuit which carries out the basically necessary functions of the communications station, such as creation of transmission data and processing of received data, and the same configuration with that of the conventional communications station can be adopted.

Figure 1:
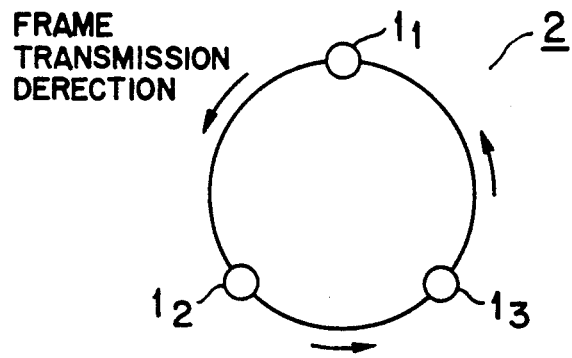
FIG. 1 is an outline configuration diagram of a LAN of the token ring system.
Figure 2:
FIG. 2 illustrates the typical configuration of a frame in the token ring LAN.

Transmission circuit 10 is a circuit to which the transmission data are entered from the internal circuit (not illustrated) as parallel data, for example, and which converts the data into the code specified in the network, adds necessary assistant data, such as FCS code, to form a transmission frame of such configuration as illustrated in FIG. 2 and sends out serially the frame to the network. The configuration of a conventional transmission circuit can be employed for the above purpose of transmission circuit 10.

Furthermore, transmission circuit 10 has a transmission frame SA extraction circuit 101 which extracts from the transmission data the data (SA) which form the SA field of transmission frame, and supplies the SA to a strip address retention circuit 12 mentioned later.

Receiving circuit 11 decodes the frame that is received serially from the network, checks errors on the basis of the FCS in the received frame, and if no error is found, sends out the data in the range from the AC field to the FCS field of the frame to the internal circuit. The configuration of a conventional receiving circuit can be employed for this purpose of receiving circuit 11.

Furthermore, receiving circuit 11 is provided with a received-frame SA extraction circuit 111 which extracts the data (SA) forming a SA field of the received frame and sends out the SA to a coincidence detection circuit 13 mentioned later, and a timing information generation circuit 112 which sends to strip address retention circuit 12 the timing information when the SA is being extracted.

The frame recognition apparatus of this invention comprises transmission-frame SA extraction circuit 101 in transmission circuit 10, received-frame SA extraction circuit 111 and timing information generation circuit 112 in receiving circuit 11, strip address retention circuit 12, and coincidence detection circuit 13.

Strip address retention circuit 12 retains the SA sent from transmission-frame SA extraction circuit 101 and, based on timing information sent from timing information generation circuit 112, sends the retained SA to coincidence detection circuit 13. In addition, strip address retention circuit 12, every time when a new SA is sent from transmission-frame SA extraction circuit 101, updates the SA retained to the new SA. Proper circuits such as semiconductor memory, flip-flop and register circuits can be adapted as strip address retention circuit 12.

Coincidence detection circuit 13 compares the SA sent from strip address retention circuit 12 with the SA sent from received-frame extraction circuit 111, and judges coincidence between both SAS. If in coincidence, a strip frame detection signal is sent to the internal circuit. The internal circuit recognizes the completion of stripping of the frame once transmitted from the station by the strip frame detection signal.

Hereinafter operations of this embodiment are described.

Figure 3:
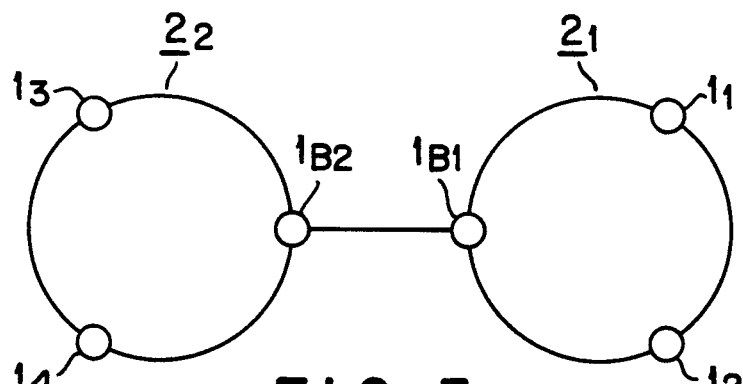
FIG. 3 is an outline configuration diagram of a LAN made of two rings connected with each other through bridge stations.

At transmission, first the transmission data including AC, FC, SA and net communications information as illustrated in FIG. 3, are entered in parallel into transmission circuit 10 from the internal circuit. If station 1 is a non-bridge station, an individual address of station 1 is set at the SA of transmission data. When station 1 is a bridge station and transfers communications data between rings, the SA of the communications data to be transfered is set at the SA of the transmission data.

Then SA of transmission data is extracted by transmission-frame SA extraction circuit 101, and sent to strip address retention circuit 12. At the same time, the transmission data is converted to the code specified for a network by transmission circuit 10 to form the transmission frame of the configuration illustrated in FIG. 3, and transmitted to the network.

The SA of the transmission frame, which is entered into strip address retention circuit 12, is retained in strip address retention circuit 12 until a next new SA is output from transmission-frame SA extraction circuit 101.

In this condition, when the frame transmitted to a network is entered into receiving circuit 11 after one round along a ring, the SA of the received frame is extracted by received-frame SA extraction circuit 111 and sent to coincidence detection circuit 13 at the time when the SA field of the received frame is entered. In addition, at the same time when this SA field is entered, the timing information is given to strip address retention circuit 12 from timing information generation circuit 112 and the SA of the preceding transmission frame retained in strip address retention circuit 12 is sent as the strip address to coincidence detection circuit 13. Coincidence detection circuit 13 compares received SA from circuit 111 with the strip address from circuit 12 and, if both of them are in coincidence, sends the strip frame detection signal to an internal circuit.

The internal circuit recognizes the completion of stripping of the received frame by the strip frame detection signal from coincidence detection circuit 13. On the other hand, if the received frame is not the frame transmitted from the station, the recognition of the completion of the frame stripping is not made since coincidence of the SAs is not detected by coincidence detection circuit 13 and no strip frame detection signal is entered into the internal circuit.

Thus, since in the embodiment illustrated in FIG. 4 hardware extracts the SA as the strip address from the transmission frame, setting of the strip address by a program is unnecessary. Further, since new strip address corresponding to a new transmission frame is set at every transmission, this embodiment is applicable for the both the bridge and the non-bridge stations and both stations can be constructed of the same hardware.

Furthermore, even if a value other than the individual address of the station is set in SA field of the frame transmitted from the non-bridge station by mistake, the frame can be stripped without fail because the SA field that is set by mistake is used as the strip address.

Figure 5:
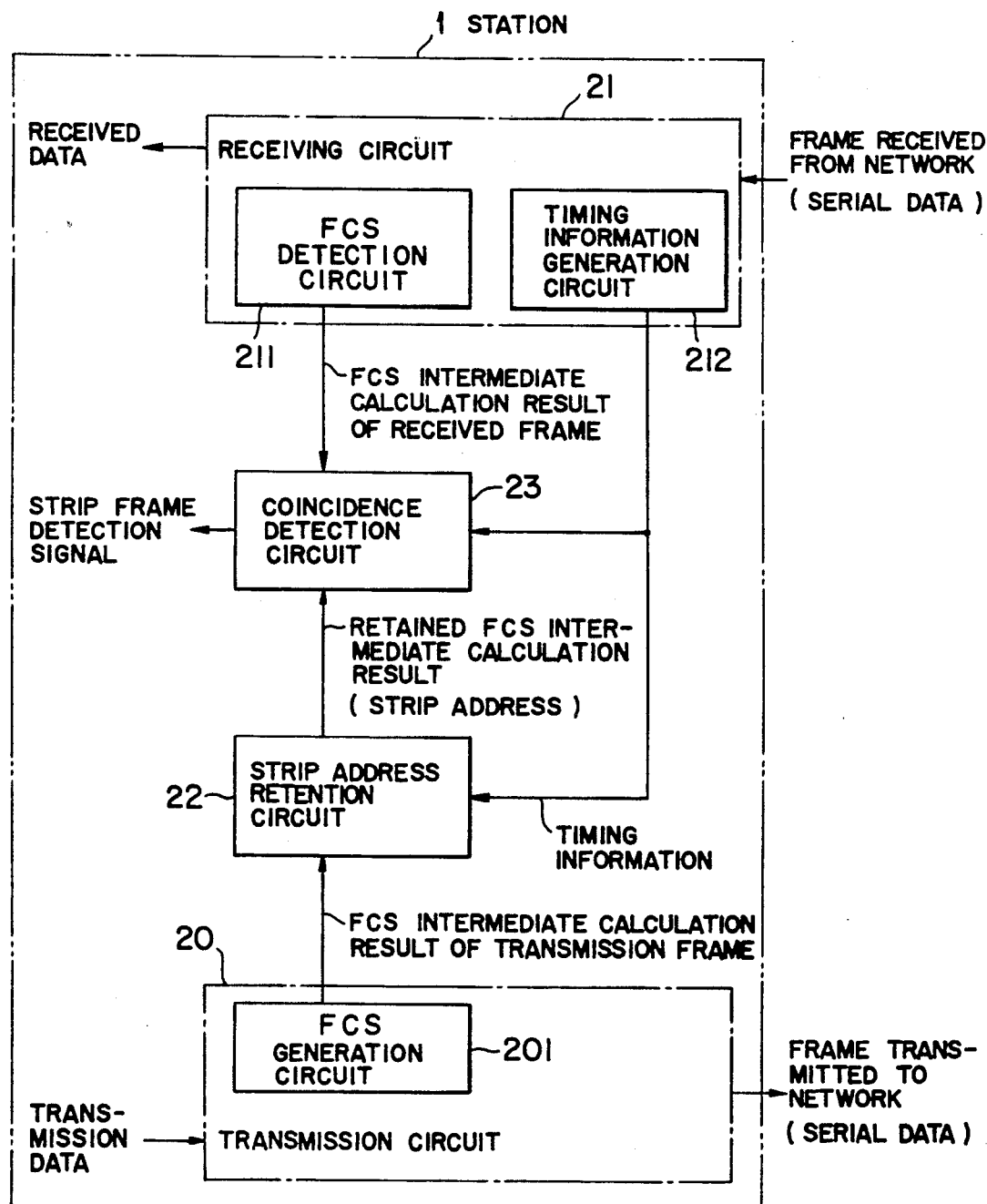
FIG. 5 is a block diagram of another preferable embodiment of this invention.

FIG. 5 illustrates another embodiment of this invention.

Difference of this embodiment from that illustrated in FIG. 4 is that not the SA but the FCS is used as the strip address. Therefore, in this embodiment, the strip frame recognition apparatus comprises a FCS generation circuit 201 in a transmission circuit 20, a FCS detection circuit 211 and a timing information generation circuit 212 in a receiving circuit 21, a strip address retention circuit 22, and a coincidence detection circuit 23.

FCS generation circuit 201 is a circuit which calculates the FCS of a transmission data entered into transmission circuit 20 from an internal circuit (not illustrated) of the communications station 1. A basic configuration similar to conventional FCS generation circuits can be adopted. The FCS calculation of FCS generation circuit 201 ranges from data of the FC field illustrated in FIG. 6 to data of the FCS itself, and the FCS calculated in such a way is built in the FCS field in a transmission frame and sent out to the network from transmission circuit 20.

Figure 6:
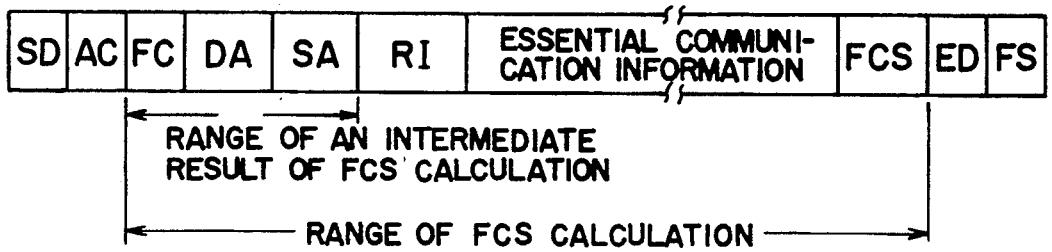
FIG. 6 is a diagram showing the range from which the calculation value of the FCS taken out as an intermediate result and whole calculation range of FCS.

FCS generation circuit 201 is equipped, in addition to the conventional configuration, with a circuit that extracts an intermediate result of the FCS calculation at the time of transmission of the SA field, and sends the intermediate results to strip address retention circuit 22. Therefore the intermediate result of FCS calculation of three fields of FC, DA and SA of the transmission frame, as illustrated in FIG. 6, is used as the strip address.

FCS detection circuit 211 in receiving circuit 21 is a circuit that calculates FCS in the range from the FC field to the FCS field of a received frame and checks errors by comparison of the calculated FCS to the FCS of the received frame. A configuration similar to conventional FCS detection circuits can be adopted as a basic configuration. This FCS detection circuit 211 is equipped, in addition to the basic configuration, with a circuit that extracts the intermediate result of FCS calculation at the time of reception of the SA field of the received frame and sends the intermediate result to coincidence detection circuit 23. Consequently the intermediate result extracted by the circuit 211 corresponds to the intermediate result of FCS calculation of the transmission-frame which is used as a strip address.

Timing information generation circuit 212 in receiving circuit 21 outputs timing information to strip address retention circuit 22 at the time when FCS detection circuit 211 calculates the intermediate result. When this timing information is output, strip address retention circuit 22 outputs the intermediate result of FCS calculation of the transmission frame as a strip address retained in itself to coincide with detection circuit 23.

Strip address retention circuit 22 and coincidence detection circuit 23 can be formed in the same configurations as those in FIG. 4. However, the bit number the FCS field (32 bits) is 16 bits smaller than that of SA field (48 bits), and therefore retention circuit 22 and coincidence detection circuit 23 are downscaled 16 bits less than those in FIG. 4.

The internal circuit of station 1 recognizes completion of frame stripping by the strip frame detection signal from coincidence detection circuit 23.

According to this embodiment, if a frame which was transmitted from the station 1 and returned to the station 1 after going around a network has the same value of the FC, DA and SA fields as those at the time when the frame was transmitted, the value which is retained in strip address retention circuit 22 is completely equal to the intermediate result which is calculated in FCS detection circuit 211, and a coincidence signal is output from coincidence detection circuit 23 and the received frame is judged to be stripped. On the other hand, if a frame transmitted from a station has a different value of SA field, and the result calculated in FCS detection circuit 211 differs from the value retained in strip address retention circuit 22, the frame is not judged to be stripped.

It may happen that an error occurs in a frame going around the network and that data in the frame is changed. However, bit numbers of the above-mentioned three fields are very small in comparison with the bit number of whole range of FCS calculation. Therefore, the probability that errors happen in the three fields is very small, and it is of little possibility that the intermediate result of FCS calculation will be substantially changed by an error.

As mentioned above, this embodiment has an advantage in that the strip address retention circuit and coincidence detection circuit can be downscaled 16 bits less than those in FIG. 4. Moreover, since circuit similar to FCS generation circuit 201 and FCS detection circuit 211 are installed in a conventional station, use of these circuit 201 and 211 in this embodiment do not cause increase of hardware of a station.

According to this invention, as proved by above explanation, the strip address is created from transmission frame by means of hardware, and therefore the program for setting the strip address in a bridge station is unnecessary and processing time from request of transmission to actual transmission can be shortened. In addition, since the strip address is created from a transmission frame at every transmission of the frame, the same hardware can be adapted for both of the bridge and non-bridge stations.

This invention is not limited to the embodiments described above, but various changes and modifications may be made without departing from the scope of the invention. For example, the following is a modification of the embodiment in FIG. 5.

All intermediate values of FCS calculations in 32 bits in length are retained in strip address retention circuit 22 in the embodiment in FIG. 5. In this modification, however, it is also possible that only a part of the bits (e.g. less significant 16 bits) are retained, and only the bit value (the least significant 16 bits in the former embodiment) corresponding to the bits retained in strip address retention circuit 22 are output from FCS detection circuit 211 to coincide with detection circuit 23.

According to this modification, hardware quantity of strip address retention circuit 22 and of coincidence detection circuit 23 can be reduced by reduced bit number.

Furthermore, since the FCS is essentially the code which is used for detecting errors arising during communications, the probability that the same code corresponds to different data is very small. Therefore, even if the strip adress does not have all 32 bits of the FCS but is limited to a number of bits (e.g. 16 bits), the probability that the same strip address is obtained for different data is very small (in the present case, merely $2^{-16}$— about one-sixty five thousandth). Consequently, the probability that a non-strip frame is judged to be the strip frame is too small to cause a practical problem.

Furthermore, even in such a small system where the address field is 16 bits, both the method using the whole SA field as the strip address and the method using a part of the FCS bits can be adopted.

What is claimed is:

1. A strip frame recognition apparatus in a station of a token ring local area network for recognizing a received frame as a strip frame which has been transmitted from the station, the strip frame recognition apparatus comprising:

transmitter means for transmitting a frame to the network, the transmitter means including strip address extraction means for extracting a strip address from a predetermined field of every frame from the station, retention means for retaining the strip address extracted by the strip address extraction means, receiver means for receiving a frame from the network, the receiver means including information extraction means for extracting information corresponding to a strip address from every frame received from the network, and coincidence detection means for comparing, for every frame received from the network, the information extracted by the information extraction means with the strip address retained in the retention means, detecting coincidence between the information and the strip address, and judging by detection of the coincidence that the received frame is the strip frame.

2. A strip frame recognition apparatus as claimed in claim 1 wherein the strip address extraction means extracts a source station address from the transmission frame and sends the source stations address as the strip address to the retention means, and that the information extraction means extracts a value corresponding to the source station address from the received frame and sends the value as the information to the coincidence detection means.

3. A strip frame recognition apparatus as claimed in claim 1 wherein the strip address extraction means calculates a frame check code for the transmission frame and sends the code as the strip address to the retention means, and that the information extraction means calculates a frame check code for the received frame and sends the code for the received frame to the coincidence detection means.

4. A strip frame recognition apparatus as claimed in claim 3 wherein the strip address sent to the retention means is an intermediate calculation result of the frame check code calculated for a part of the transmission frame including at least a source station address field of the transmission frame, and the information compared with the strip address is an intermediate calculation result of the frame check code calculated for a part of the received frame including at least a source station address field of the received frame.

5. A strip frame recognition apparatus as claimed in claim 3 wherein the strip address sent to the retention means is a code comprising a part of bits of the frame check code for the transmission frame, and that the information compared with the strip address is a code comprising a part of bits of the frame check code for the received frame.

6. A strip frame recognition apparatus as claimed in claim 4 wherein the strip address sent out to the retention means is a code comprising a part of bits of the intermediate calculation result for said transmission frame, and that the information compared with the strip address is a code comprising a part of bits of the intermediate calculation result for the received frame.

* * * * *